Oct. 17, 1950 M. D. LISTON ET AL 2,526,491

THERMOPILE

Filed July 31, 1947 3 Sheets-Sheet 1

INVENTORS
Max D. Liston
BY Kurt W. Opperman
Pennie Edmonds Morton Barrows
ATTORNEYS Fig. 4,
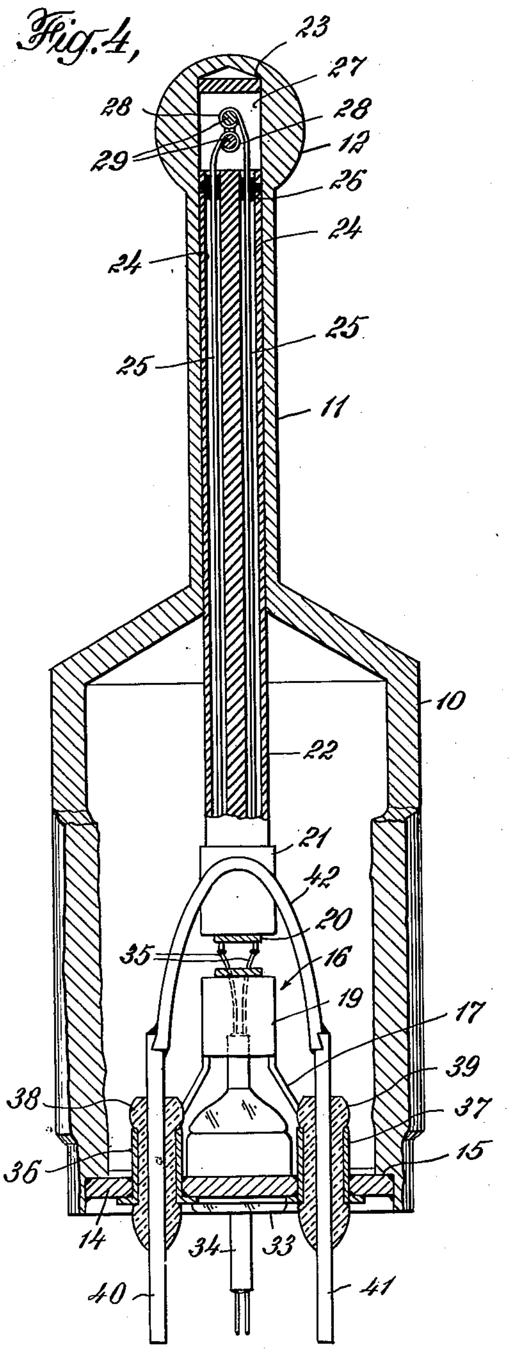
Fig. 5,
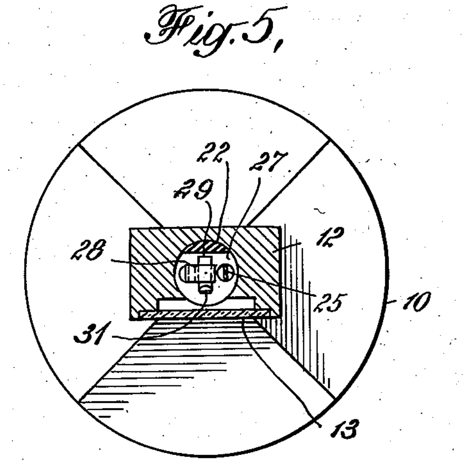
Fig. 6.
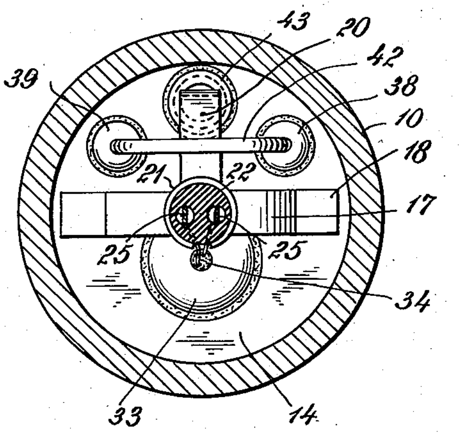
Fig. 7,
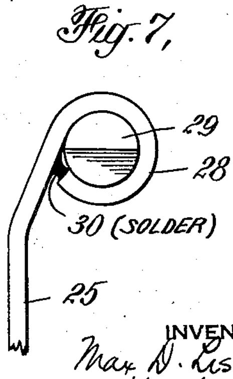
INVENTORS
Max D. Liston
BY Kurt W. Opperman
Pennie Edmonds Morton & Barrows
ATTORNEYS

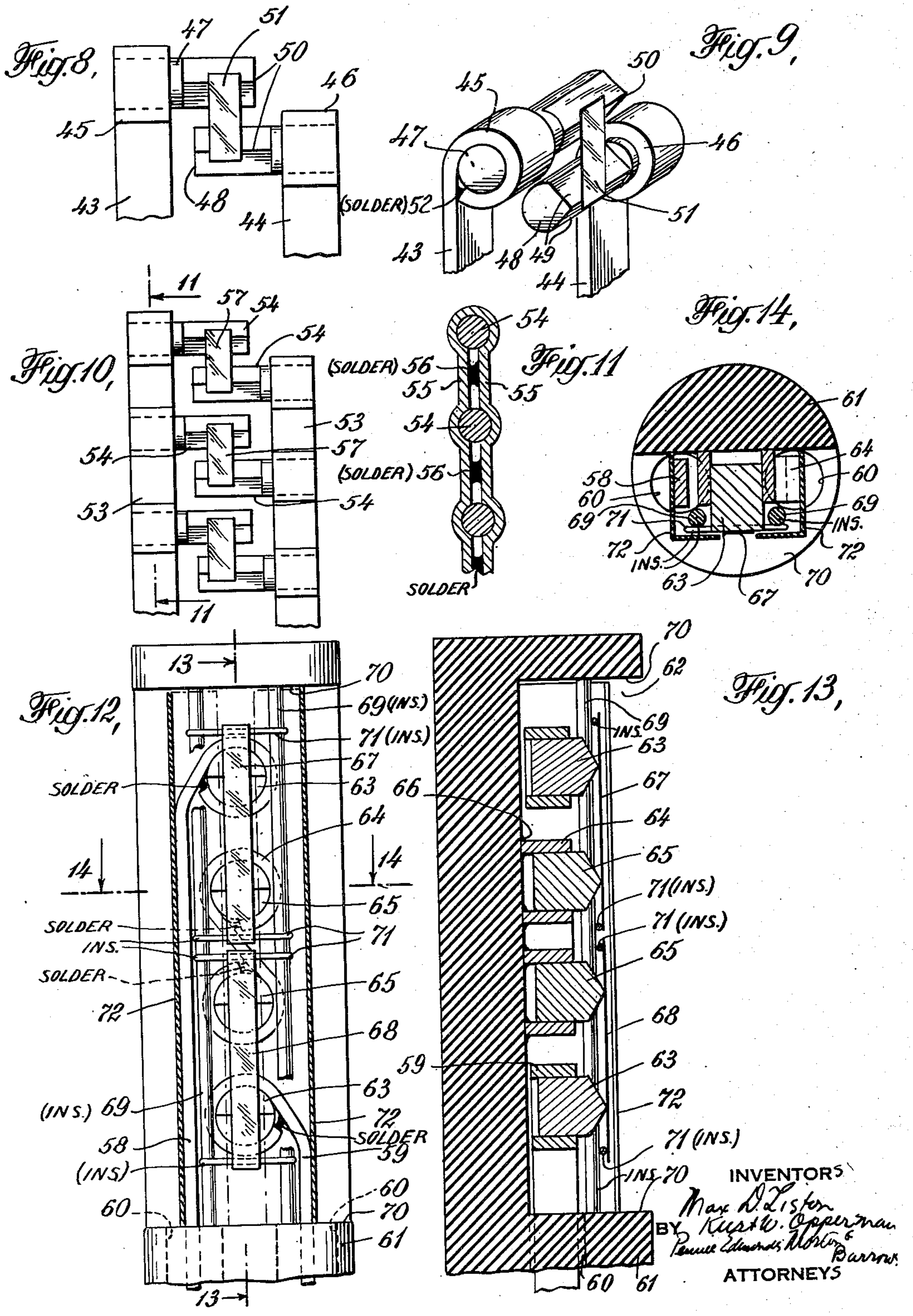
Fig. 8, Fig. 9, Fig. 10, Fig. 11, Fig. 14, Fig. 12, Fig. 13,
INVENTORS
Max D. Liston
Kurt W. Opperman
BY Pennie, Edmonds, Morton & Barrows
ATTORNEYS Patented Oct. 17, 1950

2,526,491

UNITED STATES PATENT OFFICE 2,526,491

THERMOPILE

Max D. Liston, Wilton, and Kurt W. Opperman, Stamford, Conn., assignors to The Perkin-Elmer Corporation, Glenbrook, Conn., a corporation of New York Application July 31, 1947, Serial No. 765,012

10 Claims. (Cl. 136—4)

This invention relates to thermoelectric devices such as are used in pyrometers, thermopiles, and similar applications. More particularly, the invention is concerned with a novel thermoelectric device, which performs well, is not readily susceptible to damage by shock or vibration, and is much easier to manufacture than prior similar devices. The new thermo-couple is of high sensitivity and, consequently, well adapted for detecting and measuring radiation.

Certain thermoelectric devices, such as radiation thermo-couples, include a pair of small thermoelectric elements having tapered ends, connected by a piece of foil welded thereto. The elements are attached by fusing or welding to supports in insulating mountings and the assembly is enclosed within an evacuated chamber, such as a glass envelope. The small size of the elements makes them difficult to handle in welding operations, so that considerable skill must be used and time expended in properly attaching the elements to the supports. Also, it is difficult to mount the assembly in an evacuated chamber in such a way that the junctions of the foil and elements will be protected against damage by shock.

In the new device, the difficulties above mentioned are overcome by making the elements in the form of small rods and securing the elements to conducting supports by compressive forces continuously applied by the supports at normal operating temperatures. For this purpose, each support may be formed with an opening which is normally of slightly less diameter than one of the elements, and, when an element is to be mounted in place, the support is heated adjacent the opening to cause the support to expand and make the opening large enough to permit insertion of the element. Thereafter, when the support cools and shrinks, the walls of the opening apply compressive force to the element and grip it so tightly that it cannot shift in position when the support is at normal temperature. In another form of the mounting, the support has an opening which is defined by a resilient part of the support, such as a hook-shaped end portion, and is normally of less diameter than the element. To secure the element in place, the hook is pried to enlarge the opening and, after the element is inserted, the hook is released and springs back to grip the element tightly. The end of the hook may then be soldered to the adjacent part of the support, the shrinkage of the solder upon cooling causing increased gripping pressure on the element. In addition to the new mountings for the elements, the device of the invention includes various novel features which will be pointed out in the description to follow.

For a better understanding of the invention, reference may be made to the accompanying drawings, in which:

Fig. 4 is a sectional view on the line 4—4 of Fig. 3;

Figures 1, 2, 3:
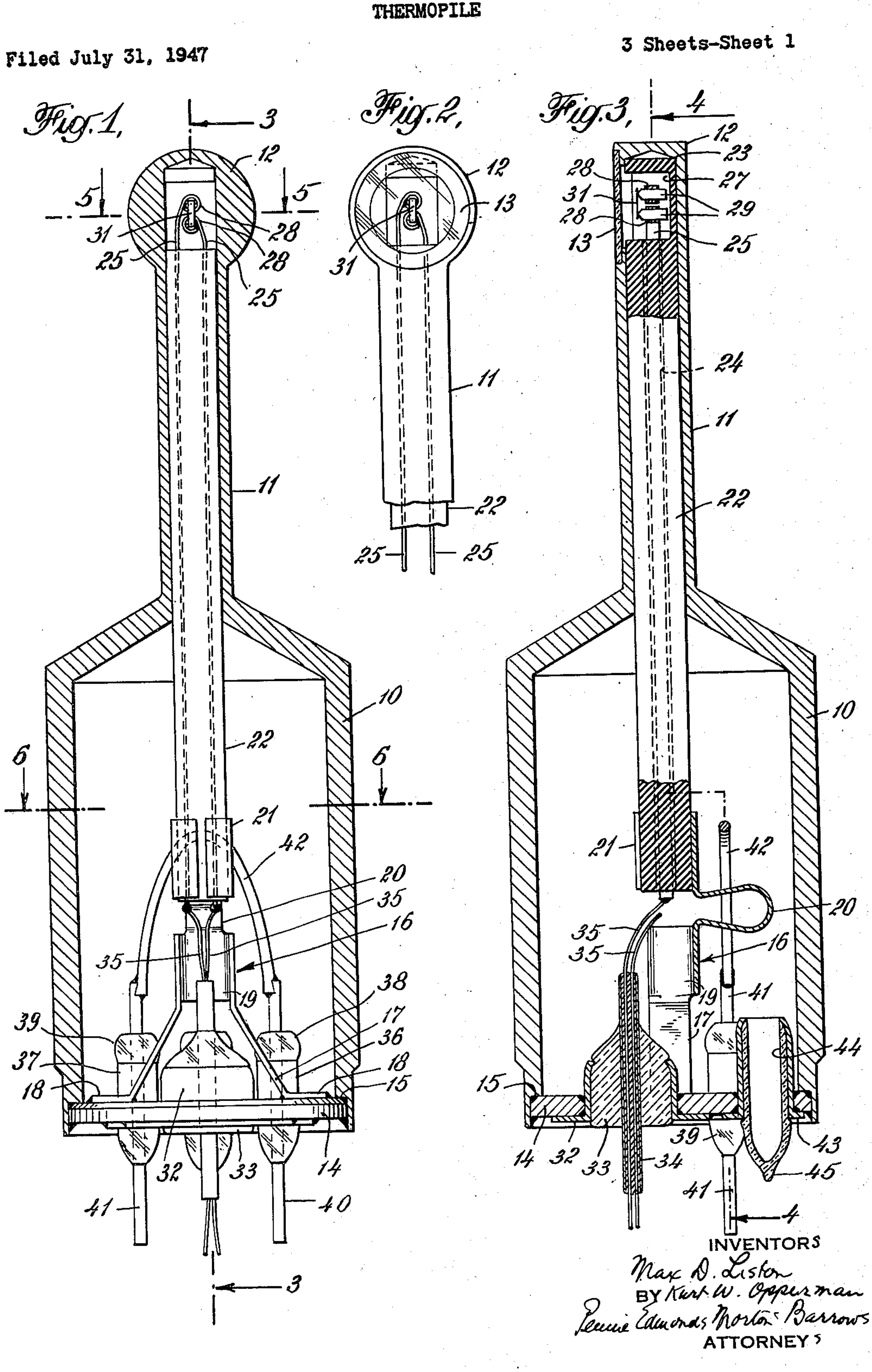
Fig. 1 is a longitudinal sectional view of one form of thermopile embodying the invention.
Fig. 2 is a view in elevation of a part of the thermopile.
Fig. 3 is a sectional view on the line 3—3 of Fig. 1.

Figs. 5 and 6 are sectional views on the lines 5—5 and 6—6, respectively, of Fig. 1;

Fig. 7 is a view in side elevation, on an enlarged scale, of one form of mounting for a thermoelectric element;

Figs. 8 and 9 are views in side elevation and perspective, respectively, of another form of thermocouple;

Fig. 10 is a view in side elevation of a thermocouple, including a plurality of units in parallel;

Fig. 11 is a sectional view on the line 11—11 of Fig. 10;

Fig. 12 is a front elevational view of a thermocouple, including a plurality of units in series; and Figs. 13 and 14 are sectional views on the lines 13—13 and 14—14, respectively, of Fig. 12.

The thermopile illustrated in the drawings includes a metallic housing 10 of circular cross-section and provided at its upper end with a neck 11, which terminates in a head 12. The lateral wall of the neck is cut away near its free end to provide an opening which is closed by a window 13 of suitable transparent material, as, for example, rock salt, when the thermopile is to be used in the infrared field.

The end of the housing opposite that from which the neck extends, is closed by a metal plate 14, which is seated against a circumferential shoulder 15 on the housing wall and held in place by solder. A standard 16, made of sheet metal, is mounted on the inner face of plate 14 and includes a pair of upwardly convergent legs 17 having flat lower end portions 18, which rest on the inner face of plate 14 and are secured thereto as by soldering. The legs are connected at their upper ends to a central section 19 of generally cylindrical form and a flat spring strip 20 bent to loop shape is connected to the top of the central section and, at its free upper end, supports a spring clamp 21 of cylindrical form. The standard is so formed and mounted that the clamp 21 is concentric with the opening through neck 11.

A cylindrical insulator 22, preferably of ceramic material, is mounted at its lower end in the clamp 21 and extends upwardly through the housing and through the neck to the closed upper end thereof. The insulator is urged upwardly through the neck by spring 20 and held against the inner wall 23 of the top of the neck, which serves as a stop. The insulator is formed with a pair of parallel lengthwise passages 24, through which extend conductors 25. Each conductor is a flat strip, preferably made of silver, and the conductors are held in place in their respective passages with their flat faces opposed by insulating material 26, (Fig 4) which is introduced into the passages through lateral openings through the insulator, and then allowed to harden. A portion of the insulator adjacent its outer end is cut away to form a chamber 27, into which the ends of the conductors 25 extend.

The free ends of the conductors within chamber 27 are bent to form hooks 28, which lie one above the other in the axis of the insulator. The thermoelectric elements 29 may be made of any of the well known metallic materials used for the purpose, such as tellurium and bismuth, tellurium and a bismuth-antimony alloy, the compounds containing copper, silver, tellurium, selenium, and sulphur disclosed in Schwarz Patent 2,397,756, etc. The elements have the form of small rods or pins and the diameter of each element is slightly less than the opening through a hook, when the hook is at normal temperature. In order to insert an element in place, the end of the hook is pried away from the stem of the hook to enlarge the opening defined by the hook, and the element is then placed in the opening and the end of the hook released. The resilience of the hook causes it to grip the element and the gripping force may be increased by placing a drop 30 of molten solder between the end and the stem of the hook. When the solder cools and shrinks, the pressure applied to the element by the hook is increased.

In the construction shown, the conductors 25 are so mounted in the passages through the insulator that the elements, when mounted in the hooks, lie parallel and transverse to the axis of the insulator. The axes of the elements extend normal to the plane of the window and the end of each element adjacent the window is formed with a pair of flat converging surfaces, which meet in a line parallel to the surface of the window. The tapered ends of the elements are connected by a piece of gold foil 31, one flat face of which is secured to the elements by welding. The outer face of the foil, which is exposed through the window, is blackened in any suitable manner.

The plate 14 has a number of openings therethrough and a metallic bushing 32 is mounted in one of the openings and has a flange lying against the outer surface of the plate. The bushing is held in position in the plate by solder and the interior of the bushing is filled by a body of glass 33 sealed to the bushing. A metallic tube 34 is sealed through the body of glass. A pair of conductors 35 pass through tube 34 and are insulated from one another and from the tube by resin, which fills the interior of the tube around the conductors. The conducting strips 25 project downwardly beyond the end of the insulator and are connected to the inner ends of conductors 35.

Another pair of openings through plate 14 contain bushings 36, 37 welded in place and containing bodies of glass 38, 39 sealed to the bushings. Conductors 40, 41 are sealed through the glass and their inner ends are connected by a wire 42 having a coating of a gettering material.

The last opening through the plate 14 contains a bushing 43 lined with a glass tube 44 sealed to the bushing. This tube provides means for connecting the interior of the housing to a vacuum pump, in order that the housing may be evacuated and, after the desired degree of vacuum has been established within the housing, the tube 44 is sealed off from the pump as indicated at 45. The getter is vaporized from wire 42 to clean up residual gases by passing a current through the wire.

The thermocouple shown in Fig. 8 includes a pair of supports 43, 44 made of metal strips having their ends bent to form hooks 45, 46. The strips are disposed in spaced relation with the axes of the openings through the hooks lying parallel and offset and the thermoelectric elements 47, 48 are mounted in the openings through the hooks and extend in opposite directions from the hooks so as to lie one above the other and tangent to a plane. The elements are preferably formed with flat converging surfaces 49, so that each element has a sharp edge 50 lengthwise on one side. These edges are connected by a foil 51, which may be secured to the edges by percussion welding. The hooked ends of the elements define openings normally somewhat smaller than the ends of the elements to be mounted therein and, in order to mount the elements in place, the hooks are pried to enlarge the openings, the elements are inserted in the openings, and the hooks then released. The hooks spring back to grip the elements, after which a small amount of molten solder 52 may be placed between the end of each hook and the adjacent portion of the support. When the solder cools and shrinks, it helps to increase the pressure with which the hooks grip the elements.

The thermocouple shown in Figs. 10 and 11 includes a number of pairs of elements in parallel. The elements are supported in a pair of supports 53, each support consisting of a strip of metal bent back upon itself and formed with enlargements forming openings, in which the ends of the elements 54 may be received. Between adjacent openings for the elements, each strip has lengths 55 lying parallel and close together. The strips are sprung apart slightly to enlarge the openings to permit them to receive the elements, and after the strips are released, drops of molten solder 56 are placed between the flat lengths 55 of the strips. The gripping force applied to the elements results partly from the springiness of the strips and partly from the shrinkage of the solder. The elements carried by the respective strips lie one above the other, and the elements on the respective strips are connected together in pairs by foils 57 welded thereto.

The thermocouple shown in Fig. 12 includes a pair of supports in the form of strips 58, 59 mounted in passages 60 in an insulator 61 and projecting out of the passages with their ends lying in a recess 62 formed by the cutting away of the material of the insulator. The support 58 extends close to the remote end of the cut-out, while the end of support 59 lies near the ends of the passages 60. Both supporting strips are provided with hook ends and the ends lie with the axes of the openings in the hooks parallel and in the same plane. Thermoelectric elements 63 are mounted in the openings defined by the hooks on strips 58, 59. Between the hooks, there is an S-shaped support 64 having a pair of openings, in which elements 65 are disposed with their axes parallel to those of elements 63 and in the same plane. The support 64 is secured in place by being cemented at 66 to the wall of the insulator forming the bottom of recess 62. The upper element 63 is connected to the upper element 65 by a foil 67 and the lower element 63 is connected to the lower element 65 by a foil 68. In order to provide additional support for the foils, a pair of insulating rods 69, preferably made of quartz, are mounted in the insulator 61 with their ends cemented to the end walls 70 of recess 62. The rods 69 are connected by fibers 71, preferably of quartz, cemented thereto, and the fibers extend across the ends of the foils 67, 68 and are secured thereto by adhesive. A pair of mica shields 72 are disposed within the cut-out 62 and enclose all of the structure except the foils 67, 68. The shields prevent the deposition of the material employed for blackening the foils upon parts of the structure other than the foils.

In all the mountings shown, the thermoelectric elements are held in place in supports by compressive forces applied to the elements by the supports and this construction makes possible the use of elements made of metals or alloys, which can not be fused, welded, or soldered in place. A thermocouple consisting of elements of tellurium and bismuth, for example, is known to have desirable properties, but tellurium can not be soldered or welded to a support in such manner as to make a good contact therewith. An element of tellurium can be used without difficulty in any of the mountings illustrated. An element of bismuth could be soldered to a support, but the operation would be somewhat difficult because of the small size of the elements ordinarily used. The new mounting thus makes available the use of elements that can not be fused, welded, or soldered and simplifies the attachment of elements, which can be soldered in place but only with difficulty.

In the welding of the foil to a pair of elements, percussion welding is satisfactory. This method causes the foil to be secured to the elements over small areas only, and would not be satisfactory in welding such a material as tellurium to a support, because of the high resistance that would be developed at the weld.

We claim:

1. A thermoelectric device which comprises a pair of conductors, one of the conductors having an end portion of flat strip form bent about an axis parallel to its wide faces to form a hook which is almost completely closed, a thermoelectric element of rod form and of a diameter greater than the normal opening through the hook, the element being held tightly within the hook with the axis of the element parallel to the wide inner face of the hook, a thermoelectric element attached to the other conductor, the elements lying parallel and close together, a piece of foil connected to the elements, and an insulating mounting for the conductors.

2. A thermoelectric device which comprises a pair of conductors, one of which is of strip form and has an end bent about an axis parallel to its wide faces to form a hook, a thermoelectric element of rod form held tightly within the hook, the axis of the element lying parallel to the wide inner face of the hook, a thermoelectric element attached to the other conductor, a piece of foil connected to the elements, and an insulating mounting for the conductors.

3. A thermoelectric device which comprises a pair of metallic strips lying parallel and with their wide faces opposed, an insulating mounting for the strips, the adjacent end portions of the strips being bent about axes parallel to their wide faces to form nearly closed hooks, a pair of thermoelectric elements of rod form gripped tightly by the hooks and lying with their axes parallel to the wide inner faces of the respective hooks, and a piece of foil connecting the ends of the elements.

4. A thermoelectric device which comprises a pair of conductors having ends lying adjacent one another, said end of one conductor being of hook form and the end of the hook being connected to the conductor by solder to define an opening, a thermoelectric element mounted in the opening, the element being of larger cross-section than the normal cross-section of the opening and the wall of the opening gripping the element, a thermoelectric element attached to said end of the other conductor, and a piece of foil connected to both elements.

5. A thermoelectric device, which comprises a pair of conductors lying side by side, the first conductor having parallel portions bent outwardly at intervals to form enlarged spaces between the portions, a thermoelectric element mounted in each enlarged space, means connecting said parallel portions between the spaces, a plurality of thermoelectric elements attached to the second conductor and lying close to the elements mounted on the first conductor, and a piece of foil connecting each element mounted on the first conductor to an element attached to the second conductor.

6. A thermoelectric device which comprises a pair of conductors lying parallel and spaced apart, the conductors having flat end portions bent about axes parallel to the wide faces of the end portions to form hooks defining openings with parallel axes lying in the space between the conductors, a pair of thermoelectric elements of rod form lying within the hooks with their axes parallel to the wide inner faces of the hooks and gripped by compressive forces applied by the hooks, the elements being spaced apart, a pair of spaced thermoelectric elements disposed in the space between the first pair of elements, a flat metallic strip having its ends bent about axes parallel to its flat faces to form hooks tightly gripping the elements of the second pair and holding them parallel to the elements of the first pair, and pieces of foil, one connecting an element of the first pair to the adjacent element of the second pair and the other connecting the remaining elements.

7. A thermoelectric device which comprises a pair of conductors, a pair of thermoelectric elements of rod form attached to the respective ends of the conductors, the elements lying spaced apart, a pair of spaced thermoelectric elements of rod form disposed in the space between the first pair of elements, the elements lying with their axes parallel, means supporting the second pair of elements and connecting them electrically, pieces of foil, one connecting an element of the first pair to the adjacent element of the second pair, and the other connecting the remaining elements, the pieces of foil projecting outwardly beyond the elements connected thereby, and an insulated structure having members attached to the projecting portions of the pieces of foil and helping to support them.

8. A thermoelectric device which comprises a pair of conductors, a pair of thermoelectric elements attached to the respective ends of the conductors, the elements lying spaced apart, a pair of spaced thermoelectric elements disposed in the space between the first pair of elements, means supporting the second pair of elements and connecting them electrically, pieces of foil, one connecting an element of the first pair to the adjacent element of the second pair and the other connecting the remaining elements, the pieces of foil projecting outwardly beyond the elements connected thereby, and means attached to the projecting portions of the pieces of foil and helping to support them, said means including rods extending lengthwise of the pieces of foil and cross-rods of insulating material connecting the first rods and connected to the pieces of foil.

9. A thermoelectric device which comprises a pair of conductors having portions lying adjacent to one another, at least one of said conductors being a metallic strip having a portion bent about a transverse axis parallel to the wide faces of the strip and offset therefrom, said bent portion forming a socket open at its ends and having at least one narrow lengthwise opening, parts of the strip at opposite sides of said opening being connected by solder, a thermoelectric element of rod form mounted in said socket with one end exposed at one end of the socket, the element being of larger cross-section than the socket when the walls of the socket are in unflexed condition, the element being gripped by the walls of the socket, a thermoelectric element attached to said portion of the second conductor, and a piece of foil connecting both elements.

10. A thermoelectric device, which comprises a pair of metallic strips, each having a portion bent about a transverse axis parallel to its wide faces and offset from the strip, said bent portion forming a socket open at its ends and having at least one narrow lengthwise opening, parts of the strip at opposite sides of said opening being connected by solder, a thermoelectric element of rod form mounted in each socket with one end exposed at one end of the socket, the element being of larger cross-section than the socket when the walls of the socket are in unflexed condition, the element being gripped by the walls of the socket, and a piece of foil welded to the exposed ends of the elements.

MAX D. LISTON.
KURT W. OPPERMAN.

REFERENCES CITED

The following references are of record in the file of this patent:

UNITED STATES PATENTS

| Number | Name | Date |
|---|---|---|
| 2,194,489 | Woodson | Mar. 26, 1940 |
| 2,205,878 | Eby | June 25, 1940 |
| 2,225,460 | Porth | Dec. 17, 1940 |
| 2,284,547 | West | May 26, 1942 |
| 2,305,396 | Volochine | Dec. 15, 1942 |
| 2,381,819 | Graves et al. | Aug. 7, 1945 |
| 2,393,196 | Schwarz | Jan. 15, 1946 |

FOREIGN PATENTS

| Number | Country | Date |
|---|---|---|
| 47,410 | France | Jan. 28, 1937 |

OTHER REFERENCES

Cartwright, C. H.: Rev. Sc. Insts., vol. 3 (1932), pages 74, 75.

Strong, J.: Procedures in Experimental Physics (1942), pages 170, 171, 309, 310, 314–317.